Dec. 19, 1967     N. S. GIDWANI     3,359,089
METHOD AND APPARATUS FOR ELIMINATING ARCING
IN GAS-ELECTRIC SEALING OF TV BULBS
Filed July 7, 1964
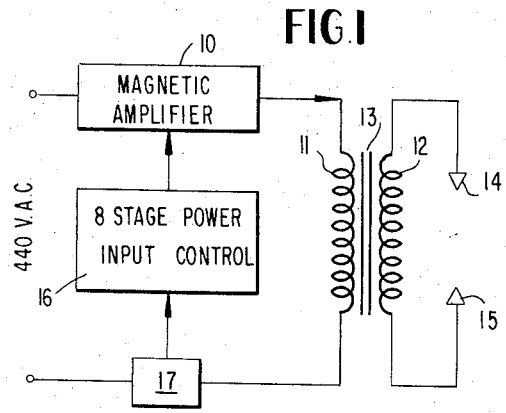
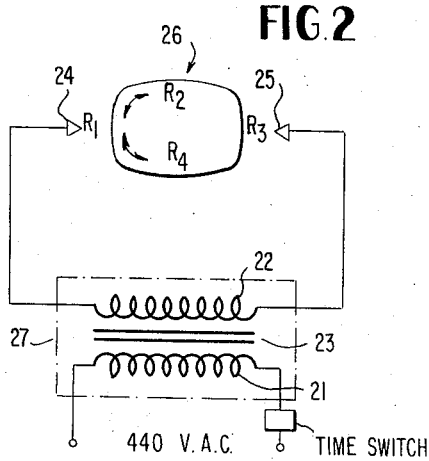
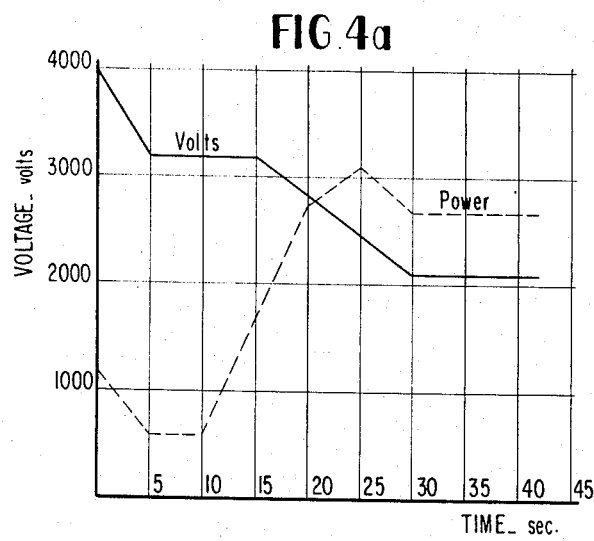
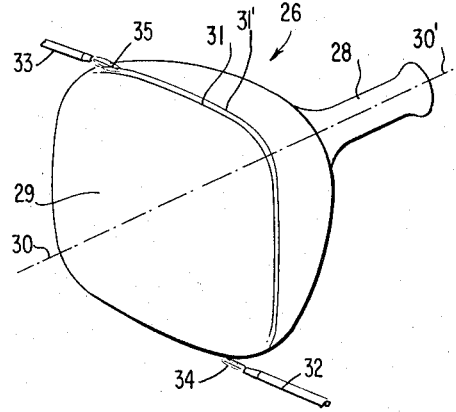
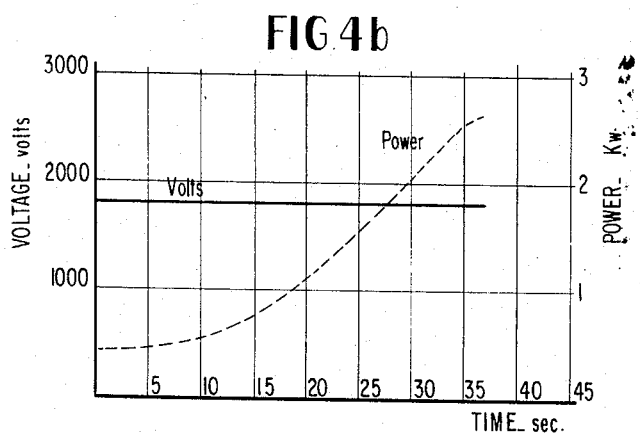
INVENTOR.
NARAIN S. GIDWANI
BY W. A. Schaich and
E. J. Holler
ATTORNEYS

United States Patent Office 3,359,089
Patented Dec. 19, 1967

3,359,089
METHOD AND APPARATUS FOR ELIMINATING ARCING IN GAS-ELECTRIC SEALING OF TV BULBS
Narain S. Gidwani, Columbus, Ohio, assignor to Owens-Illinois, Inc., a corporation of Ohio
Filed July 7, 1964, Ser. No. 380,799
7 Claims. (Cl. 65—40)

ABSTRACT OF THE DISCLOSURE

Current to electrically heat and seal TV tubes is supplied at a voltage limited to a value at which arcing does not occur, and is limited by transformer design to prevent run-away heating as the glass resistance drops drastically with rising temperature, the turns ratio and core flux capacity being selected to limit output power.

---

This invention relates generally to glass welding by an electric current, and more particularly to method and apparatus for preventing arcing of the heating current through gaseous electrodes to the glass members being joined.

In the manufacture of television picture tubes the problem of sealing a glass funnel to the viewing face of the tube presents problems of particular difficulty in which ordinary glass sealing methods are generally not applicable. One such problem arises from the noncircular shape of the tube, making uniform heating during rotation difficult. It is known to cause gas flames to be cammed to and from an axis of rotation about which the funnel and the adjacent viewing face are rotated, such that the flames are maintained at nearly constant distance from the edges of the two glass pieces being sealed together but it is found preferable to supplement gas flame heating with more precisely controlled electrical heating. Induction and dielectric methods have been proposed for transferring the electrical energy to the glass, but with undesirable spreading of the heating effect.

One means of overcoming these difficulties is to supply an electric current via electrodes in gas flames used to preheat the glass. This current is caused to pass primarily through the outer heated edges of the two juxtaposed portions of glass before they are pressed together. This results in a localized electrical heating which depends on the fact that the conductivity of glass increases greatly as the temperature rises toward and beyond the softening point. Uniformity of heating during such preheating is effected by rotation of a hollow structure being sealed to cause the current to be distributed more uniformly along the edges and heat the outermost portions according to $I^2R$.

It has been considered essential to employ a varying series impedance to control the amount of current which can reach the partially heated glass because glass suitable for electric welding has a tendency to suddenly overheat due to the negative temperature coefficient of resistance. A widely used prior art arrangement has an opposed set of gas burners impinging gas along juxtaposed edges of the glass funnel and face plate. Power is supplied from an A.C. line via a transformer which has a secondary winding connected across oppositely placed electrodes within the gas flames so that the output voltage causes current flow through the flames into the glass in a broadly diffused current pattern, as in a brush discharge. In that arrangement the primary of the transformer is connected to the power supply through a magnetic amplifier which controls the maximum current permitted to flow through the transformer primary, and therefore controls in a general sense the voltage applied at the secondary winding to the electrodes. A sensing device of suitable type may be added to measure the resulting current and control the voltage applied to the primary through the magnetic amplifier, saturable reactor, or the like, but may otherwise control output in stages or steps of power applied. Such prior art methods recognize the particular advantages in glass welding operations of employing flame electrodes which provide for heating the glass edges at the weld line sufficiently to accept current and for spreading the effective electrode area sufficiently to avoid undue local heating while providing sufficient current for quickly bringing the surface-heated edges and adjoining glass to a temperature high enough for the welding of the glass into a uniform tight seal. When the glass is sufficiently heated by the electric current the edges of the pieces to be joined are thrust together and the seal may then be further heated to secure appropriate thickness and uniformity.

A particular difficulty experienced in such prior methods is that arcing tends to occur through the flame and across the space between electrodes and glass so that the current is not sufficiently diffused over the surface to effect required uniform heating. At such localities the glass may be partially decomposed by the arc to leave discontinuities and stresses in the glass, with the result that a proper seal is not made, or a seal may be made which is prone to breakage during later processing because of such stresses as are not removable by annealing. Local irregularities due to arcing of the heating current have been referred to as "knot reboil." This difficulty is responsible for the rejection of many tubes after they have been assembled and subjected to further processing and expenditure of manufacturing effort.

It is accordingly an object of this invention to provide a sealing method by which large diameter seals may be uniformly effected without the introduction of local stresses in the glass.

Another object of the invention is to provide improved apparatus for the application of an electric sealing current uniformly around the periphery of a television tube for sealing the same to the funnel.

A further object of the invention is to provide a simplified control system for eliminating arcing across flame electrodes conducting welding current in glass welding.

A further object of the invention is to provide simplified means and method for controlling welding current to join two glass structures.

These and other objects of the invention will be better understood as the description proceeds in connection with the drawings in which:

FIG. 1 is a diagrammatic showing of apparatus for performing glass seals according to prior art methods;

FIG. 2 is a diagrammatic sketch of apparatus for performing the method of this invention;

FIG. 3 is a diagrammatic showing of apparatus according to FIG. 2 for sealing a television tube face to a funnel; and FIGS. 4A and 4B illustrate comparative voltage and power variations during a glass sealing operation according to prior methods and the method of this invention.

Basically, the present invention substitutes for the high voltage transformer in series with a magnetic amplifier, or other current control in the primary which controls the secondary output, a transformer proportioned to provide a controlled maximum output voltage of 1800 volts (or less) and providing substantially constant output voltage even though the current is highly variable during a sealing operation. By special design of the transformer employed to supply an output voltage from the secondary which does not exceed a critical voltage above which arcing may occur, knot reboil is controlled.

FIG. 1 illustrates a conventional power control circuit for gas electrode application of welding current at the periphery of a circular member or a tubular member as in sealing the tube face to the funnel in a TV picture tube. A magnetic amplifier 10 is connected in series with a line from an A.C. source such as at 440 volts and has an output to a transformer winding shown at 11 coupled to a secondary winding 12 through conventional core material illustrated at 13. Electrodes 14 and 15 represent connections at burners supplied with suitable gas-air mixture and ignited to perform the initial heating of the glass portions to be welded. The burners are preferably of metal but make no contact with the glass since it is important that current be conducted to the glass only through the flames from the burners which serve as electrodes 14 and 15. Control apparatus for supplying a limiting current, generally to D.C. windings on a saturable core device of the magnetic amplifier type, is shown at 16, and may be controllable in a number of power steps or stages.

FIG. 2 illustrates the simplified control arrangement of the present invention in which electrodes 24 and 25 correspond to electrodes 14 and 15 of FIG. 1. Electrodes 24 and 25 may be attached to the burner structure so that current flows directly through the burners and flames to the glass, but optionally a separate electrode is positioned within the flame area of each burner. Current to and from electrodes 24 and 25 passes into the glass members to be sealed, thence in opposite paths therearound to the electrode opposite. The tube is generally illustrated at 26. It will be seen that the resistance between electrodes 24 and 25 constitutes the load on a transformer and is diagrammatically illustrated at $R_1$ for the flame at electrode 24, $R_3$ for the flame at electrode 25, and $R_2$ and $R_4$ being opposite resistive paths around opposite sides of the joint being sealed. Obviously, $R_2$ and $R_4$ will be two resistances in parallel, being in series with $R_1$ and $R_3$ to form the load for the secondary of the transformer 27. As in FIG. 1, the transformer has a primary 21 connected to the A.C. source, conveniently at 440 volts, but without a reactive current limiting device in series therewith. Secondary winding 22 is similar to winding 12 except that the turns ratio between primary 21 and secondary 22 is reduced to provide an output voltage at electrodes 24 and 25, when little or no current is flowing, not exceeding 1800 volts. Aside from the change in transformer ratio, the current supply differs in having a maximum deliverable voltage output below the knot reboil value while still delivering a voltage adequate for the sealing operation, but limited to 3000 watts for tubes of usual dimensions.

FIG. 3 illustrates schematically a television tube face 29 juxtapositioned to the funnel unit 28 for rotation about an axis 30–30′, portions 28 and 29 being held in proper position by apparatus (not shown) for simultaneous rotation in fixed relative positions during application of heat along the edges to be sealed as at 31, 31′. Burner nozzles 32 and 33 are schematically shown disposed on opposite sides of the face 29. Flames 34 and 35 are illustrated impinging along the edges 31–31′ to preheat the glass and conduct the welding current thereto. While the electrical circuitry is not shown in FIG. 3, it is to be understood that transformer secondary leads connect, respectively, to burners 32 and 33 so that flames 34 and 35 constitute resistances $R_1$ and $R_3$ as in FIG. 2. Means for holding and adjusting glass portions 28 and 29 for the welding operation and for subsequent manipulation are known in the art and need not be further described herein.

It has been found that when the voltage applied across the electrodes of a system as illustrated in FIG. 3 exceeds about 1800 volts, or less if electrode spacing is substantially reduced, arcing occurs between the metallic electrodes and the glass surface being heated, thus short-circuiting the flames by which the current is normally diffused and distributed over a considerable area of the glass surface. Localized heating then occurs, from which strains are introduced at the joint, often resulting from decomposition of glass material by intense local current action, which may cause tube breakage after the entire assembly has cooled. This strained condition in the glass is difficult to detect by inspection and damaged tubes are passed on to the customer. When the voltage across the electrodes is kept below 1800 volts this particular condition is avoided. It has also been noted that the maximum useful electrical power applied to the peripheral edge portions of a picture tube being sealed under local gas heating at the edges of the face plate funnel approximates 3000 watts. When this degree of heating is much exceeded additional difficulties arise either causing strains in the glass or undue distortion of the structural shape.

Employing arrangements of the prior art as in FIG. 1 and 4A, an A.C. power supply at a suitable primary voltage such as 440 volts is connected through a current controlling device to the primary winding of a transformer having a secondary winding at a high open circuit voltage such as 6000 volts. Suitable current controlling apparatus in the primary circuit may be directly current-responsive or be supplied with a signal from a sensing device responsive to primary current level such that the maximum current permitted to flow in the primary circuit is maintained below a predetermined maximum. This is effectively a variable impedance in series with a transformer primary winding thereby to limit current from the transformer. Voltage output from the secondary of the transformer at the beginning of a cycle is considerably above 3000 volts when little or no current is drawn through the electrodes connected to the secondary winding and then falls off as the secondary impedance decreases. As the gas flames impinge upon the periphery of the tube face it is rotated to provide an approximately uniform heating of the edge of the tube face and the adjacent edge of the funnel to heat the outermost edges of the glass most rapidly. These edges begin conducting current from the secondary winding, in small amounts at first, around opposite sides of the tube.

As the adjacent edges of the two glass portions become further heated the resistance in series with the secondary winding decreases slowly at first and then more rapidly, causing a drop in the voltage to approximately half the initial value. This drop in voltage is the result of a rapidly increasing current in the secondary to present decreased reflected impedance in the primary and a consequent increased primary current. In the conventional arrangement an eight-stage power control lowers the primary voltage as the current approaches a desired maximum value. A current limiting device in the primary, such as a magnetic amplifier, has been considered essential to counteract the effect of a negative temperature coefficient of the glass tending to cause the current to increase very rapidly with rising temperature, to further heat the glass in proportion to $I^2R$, thus to produce an unstable or runaway condition. This would cause burn out in a transformer or would provide excessive heating and complete melting of the glass. By controlling the primary current a runaway condition is prevented, but at the same time it is necessary to supply initial secondary voltage considerably above the voltage needed in the later portions of the sealing operation.

Typical operation according to prior art as shown in FIG. 1 is further illustrated in FIG. 4A where secondary output voltage is plotted against time during a sealing cycle voltage excursion beginning at a high initial value such as 4000 volts when little secondary current flows. During an initial heating interval the secondary voltage decreases rapidly as the series impedance of the primary increases to reduce secondary output. Primary voltage applied follows a similar variation and may be plotted along the same voltage curve by suitable scale selection.

Applicant has discovered that better seals are made by eliminating the upper plateau and slope in the voltage curve of FIG. 4A, principally because voltage across the electrodes in excess of 1800 volts causes the knot reboil as previously noted. The overall rejection rate of bulbs processed after sealing was found to be decreased, both on the basis of inspection and subsequent breakage, by using the altered process of this invention. A transformer of lower turns ratio was selected to have a maximum output voltage of 1800 volts with about 440 volts on the primary. By careful timing of the heating cycle and critical voltage selection the variable impedance in the primary circuit could be safely avoided and the heating cycle controlled more ideally. Voltage and power delivered are illustrated in FIG. 4B on a plot of values at successive times during a heating cycle. Primary voltage applied to the transformer remains constant and the secondary voltage remains at the set value, e.g., 1800 volts or less due to the low impedance source which consists of the main supply and primary winding without the series impedance. As temperature rises in glass which completes the circuit between the electrodes, $R_2$ and $R_4$ decrease to cause increased current at constant voltage. A curve according to a typical $I^2R$ heating value is shown in FIG. 4B, rising from an initial value of perhaps 450 watts (depending on glass temperature as current is applied) and extending upward nonlinearly to a maximum value which is generally kept below 3000 watts.

Each cycle is carefully timed to prevent overheating and destruction of the bulbs being sealed. An automatic cut-off may be provided but a more rapid production rate is obtained by training of the operator who repeatedly makes like joints and cuts off the power at the exact time to produce the best welding temperature, this time being generally between 35 and 40 seconds from the time of current application, which commences somewhat after the application of heat from the flames.

FIG. 2 illustrates the simplified control circuit which consists of a power source as in FIG. 1, conveniently at 440 volts A.C. with a transformer primary winding 21 and secondary winding 22 on core 23, comparable to coils 11, 12 and core 13 of FIG. 1 except for a much lowered maximum voltage at the secondary and a lower current capacity. The normal current maximum in coil 21 is about 6 amperes at voltage up to 1800 volts, for example in sealing a 23" bulb; whereas, a maximum of 24 amperes is obtained in the apparatus of FIG. 1, with a possible secondary output of 4000 volts under light loading at the beginning of a sealing cycle.

Current from coil 22 is conducted to electrodes 24, 25 which are represented in FIG. 3 as burners 32, 33, feeding current to glass edges 31, 31' by way of flames 34, 35. Coils 21, 22 on core 23 comprise the transformer 27 in this system and are fed from a suitable source by way of operating switches and a master switch (not shown).

A sealing cycle according to this invention consists of a brief interval of preheating by flames 34, 35 and then an interval of combined electrical heating and gas heating wherein the electrical heating rapidly increases to deepen the heating effect below that of the gas flames alone at the edges of the glass pieces to be welded together as they are raised to a softened condition. Electrical conduction occurs mainly at and adjacent these heated edges to provide smoother temperature gradients. As the temperature rises, the operator observes the glass color and condition and thereupon moves or presses together the two pieces into contact to effect the seal, terminating the electrical heating shortly thereafter as the joint is perfected. The operator then has continued control of heating for an instant after the edges are brought together. However, it is usual to then more slowly heat the glass by gas flames to effect stress relief at the joined seam, although good seams may be produced in the preceding steps.

The cycle illustrated and described is effective for glass sealing in hollow structures of various sizes, such as in TV bulbs of 17", 19" and 23" diameter. Maximum secondary voltage is set at or below value at which arcing commences. Some variation in the voltage to produce arcing is observed depending on electrode spacing from the glass, and on the tube size. A preferred electrode to glass spacing is about three-fourths inch since larger spacings, such as over one inch, cause increased power consumption and lesser spacings result in burner clogging when glass breakage occurs.

It will be noted that the power curve of FIG. 4B is approximately according to a second degree parabolic variation as observed in sealing a group of 23" tubes, while the voltage curve is constant at 1800 volts. A curve of voltage plotted against power delivered would likewise show a constant value at 1800 volts as the power varies in inverse proportion to resistance of the glass during the heating cycle.

In contrast to the power curve of FIG. 4B that of 4A is irregular and somewhat unpredictable, being a complex result of the operation of the control circuits, although it tends to approach a constant level at the end of a heating cycle. Maximum voltage input to the glass is preferably kept below 3000 watts, which, by the curve of FIG. 4B, would occur shortly after 40 seconds from first application of current. Automatic controls, such as a timing switch, may optionally be provided to turn off the current at about 40 seconds, or to time the entire current cycle. However, the operator can anticipate an automatic timing and terminate the operation manually as temperature conditions reach desired values as seen by visual appearance, thus to save a few seconds and increase the production rate appreciably. This procedure produces a more uniform and reliable result.

Regardless of the control by automatic timing and/or by visual inspection by an operator, it is desirable to provide a maximum power transfer by way of the transformer, which may be rated to deliver only the desired power before saturation of the core. If lowered glass resistance causes current to tend to increase beyond a selected overload limit, it will be apparent that the core will become saturated (for example, at about 5 kva.) so further increase of current and power is prevented; and a plateau would occur in the plot of power against time. Thus, accidental overloads are prevented from damaging equipment, but if current is conducted too long the glass may become melted so as to break the secondary circuit and terminate the electrical heating cycle, thus to provide a further protective feature in the use of apparatus and method hereof.

While the invention has been described with reference to an exemplary embodiment, it will be understood that other equivalent structures and modes of operation are intended to be included within the spirit and scope of the appended claims.

What is claimed is:

1. In a sealing machine for joining a pair of juxtaposed glass edges during rotation thereof about a common center,
   a pair of gas burners disposed to impinge a flame during a sealing cycle from each upon opposite portions of said glass edges during rotation thereof,
   a source of A.C. power,
   a transformer primary winding connected to said source,
   a transformer secondary winding connected to impress an output voltage between said burners,
   transformer core means coupling said windings to transfer A.C. voltages approaching but not exceeding 1800 volts from said source to said burners in proportion to the ratio of turns of said windings at temperatures substantially less than the melting temperature of said glass,
   said core means having limited flux capacity whereby the transformer output power is limited to a predetermined value when the glass resistance between said burners falls as the temperature of the glass approaches the melting point.

2. In a sealing machine of claim 1, said core means being proportioned to limit power output to said burners to approximately 3000 watts.

3. The method of sealing a peripheral joint between two glass members comprising the steps of preheating during a first interval said members adjacent said joint by paired gas flames impinged thereon at opposite points while rotating said members about a common axis, electrically heating during a second interval said members preheated by applying A.C. current diffusely thereto through said paired flames at a voltage not exceeding that minimum voltage at which arcing across said flames may occur, continuing said electrical heating sufficiently to deepen the heating effect below that produced by said flames, pressing together said members along said axis during continued application of said current, and continuing said gas flame heating during a third interval to cause stress relief about said joint.

4. The method of claim 3 wherein said current is supplied at voltage which approaches and does not exceed 1800 volts.

5. The method of claim 3 wherein said current is governed by automatic timing means to prevent melting away of the glass as the electrical power increases.

6. The method of claim 3 wherein said current is supplied through a transformer of a capacity selected to limit power output to a maximum in the range of 3000 to 5000 watts.

7. The method of claim 3 wherein said voltage remains constant during said second interval and said current increases substantially according to a second degree equation as the glass approaches welding temperature.

References Cited

UNITED STATES PATENTS

| | | | |
|---|---|---|---|
| 2,306,054 | 12/1942 | Guyer | 65—40 |
| 2,509,380 | 5/1950 | Walker | 219—131 X |
| 2,579,222 | 12/1951 | Wilder | 220—2.3 X |
| 3,211,885 | 10/1965 | Fischer | 219—116 X |

DONALL H. SYLVESTER, *Primary Examiner.*

R. L. LINDSAY, *Assistant Examiner.*